Oct. 23, 1962 J. HENRY-BAUDOT 3,060,337
AXIAL AIR-GAP MOTOR WITH PRINTED STATOR AND ROTOR
Filed Sept. 15, 1958 2 Sheets-Sheet 1

INVENTOR
Jacques Henry-Baudot
By Kemon, Palmer, Stewart and Estabrook
Attorneys

Oct. 23, 1962        J. HENRY-BAUDOT         3,060,337
AXIAL AIR-GAP MOTOR WITH PRINTED STATOR AND ROTOR
Filed Sept. 15, 1958                                               2 Sheets-Sheet 2

INVENTOR
Jacques Henry-Baudot
By Kemon, Palmer, Stewart
and Estabrook
Attorneys

United States Patent Office

3,060,337
Patented Oct. 23, 1962

3,060,337
AXIAL AIR-GAP MOTOR WITH PRINTED
STATOR AND ROTOR
Jacques Henry-Baudot, Antony, France, assignor, by mesne assignments, to Printed Motors, Inc., New York, N.Y.
Filed Sept. 15, 1958, Ser. No. 761,144
Claims priority, application France Nov. 13, 1957
26 Claims. (Cl. 310—268)

The present invention relates to improvements in electrical rotating machines, such as electrical motors and the like, having a plurality of poles, high electrical efficiency, and being small in size as compared to power output.

The invention is concerned with improvements in electrical rotating machines of the type described and claimed in my co-pending application Ser. No. 1,128, filed January 7, 1960, which was divided out of Ser. No. 691,434, filed October 21, 1957.

It is an object of this invention to apply and extend certain provisions of the co-pending application to A.C. asynchronous motors and more specifically, to provide certain new arrangements of components for such motors.

The above mentioned co-pending application discloses a rotating electrical machine of the type including at least one disc-shaped stator and one disc-shaped rotor member, both cooperating through an annular air-gap and at least one of these members having incorporated therein at least one electrical winding distributed over an annular area thereof with its electrical conductors extending mostly in a substantially radial direction with respect to that annular area and with at least one of these members comprising a magnetic material.

Such electrical winding was to be obtained, preferably, although not necessarily, by a technique of prefabricating electrical circuits and, primarily, by a so-called "printed circuit" technique.

The co-pending application, furthermore, describes a winding of series-connected waves of multipolar character formed over a thin supporting disc which may consist of dielectric material.

The winding extends over both faces of the disc, each of its turns having one conductor on one face, and another conductor on the other face of the disc.

Such a member was used with special advantage as a rotor for D.C. motors, A.C. generators and rotary converters. For certain uses, this member had a disc of magnetic material applied against one of its faces.

One of the objects of the invention is to produce an asynchronous motor in which the stator has a multipolar winding consisting of a "wave" type of winding spread out over the two faces of a thin supporting disc with a disc of magnetic material applied to one of its faces; and cooperating with such stator through a narrow and substantially planar annular air-gap is a rotor having a spread-out squirrel-cage type of winding.

The winding of the stator is provided with as many terminal taps on one or the other of its outer and inner peripheries as there are electrical phases in the current supply.

According to another object of the invention, the spread out squirrel-cage rotor consists of a supporting ring of magnetic material and of a plurality of substantially radial conductive paths cooperating with the air-gap and formed over, and in certain cases, partially within one face of the ring.

As a more specific object of the invention, the magnetic ring of the rotor preferably consists of a spiral of magnetic ribbon, and the conductive paths may either be formed by "printed" radial conductors bridging two conductive inner and outer circles, respectively, or by depositing a conductive metal into substantially radial slots which connect two peripheral circular slots formed in the ring.

In a preferred embodiment, such substantially radial slots are obtained from rectangular tooth-shaped indentations or notches formed in the edge of the magnetic ribbon prior to its spiralling, thereby resulting in a network of conductive meshes presenting a substantially radial distribution of conductors.

These and further objects of the invention will be more fully described with reference to the accompanying drawings.

Figure 3:
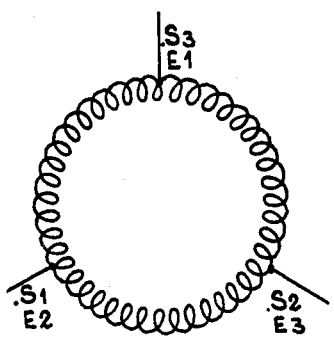
Figure 4:
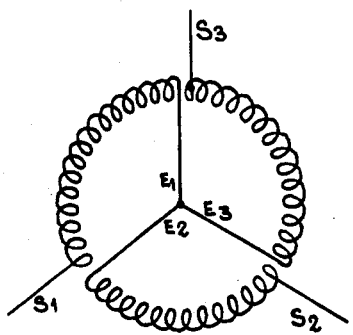

FIGS. 3 and 4, respectively, show diagrams of electrical connections for the stator winding.

Figure 5:
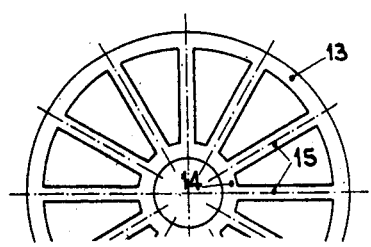
Figure 6:
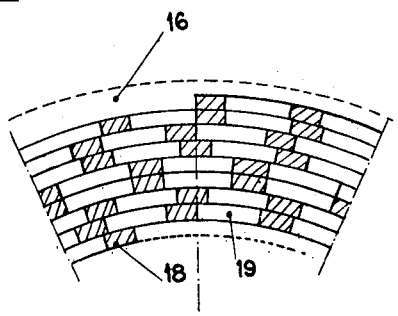
Figure 7:
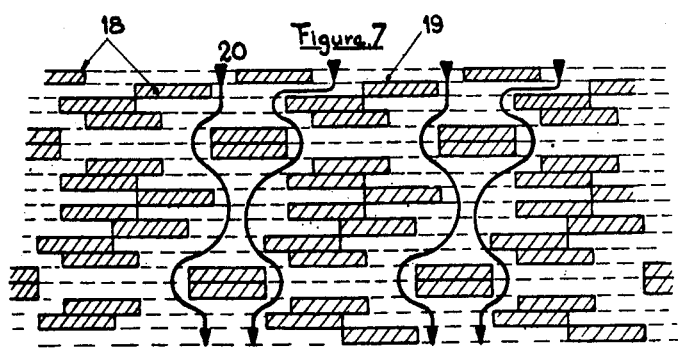

FIG. 5 shows a partial front view of a spread-out squirrel-cage type of rotor winding for the motor; and FIGS. 6 and 7, respectively, show partial front and linear development views of a spread-out squirrel-cage type rotor embodying certain features of the invention.

Figure 1:
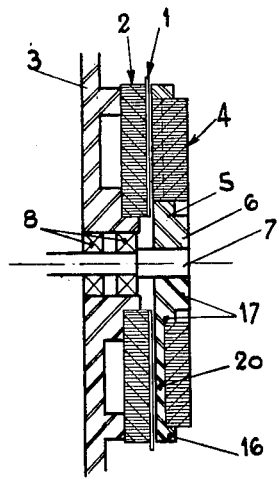
FIG. 1 shows in axial cross section an example of an asynchronous motor emboding certain features of the invention.

Referring to FIG. 1, an asynchronous motor according to the invention comprises a magnetic stator disc 2 supported on base plate 3 and having applied over its free face a winding member 1.

The rotor comprises a disc shaped member 4 of magnetic material provided with a squirrel-cage conductive structure including a pair of outer and inner rings 16 and 17, the latter being preferably integral with conductive and substantially radial bridges such as indicated at 20 and with hub 6 by which the rotor is attached to shaft 7. The entire conductive squirrel-cage unit of the rotor is denoted as 5.

A preferred rotor structure is shown in greater detail in FIGS. 6 and 7.

Shaft 7 is journalled in bearings 8 inserted in base plate 3 of the stator. Winding unit 1 is mounted on stator disc 2 to face the conductive surface of rotor structure 5 through a narrow annular air-gap.

Figure 2:
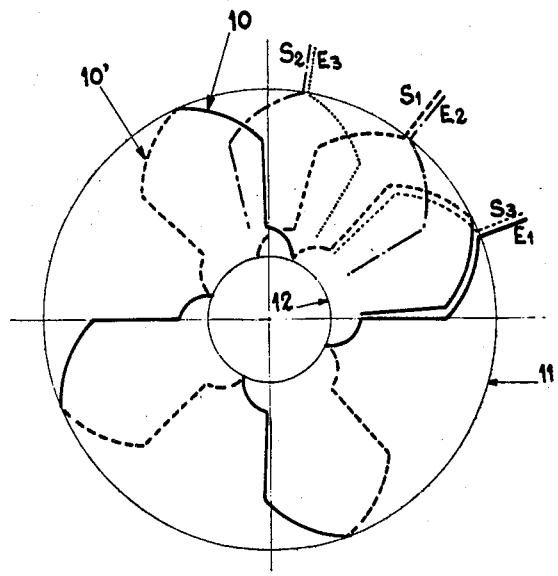
FIG. 2 shows a simplified front view of a corresponding stator member.

The stator winding is of "wave" type as shown in the front view of FIG. 2. Three stator windings are represented in FIG. 2, one for each phase of a 3-phase, 8-pole motor, but only one winding having terminals $E_1$ and $S_1$ has been shown distributed entirely around the winding disc. The other two windings are identical except that they are displaced about the axis of the winding disc by an electrical spacing of 120°. Each phase winding consists of a plurality of evenly distributed open-loop turns which are "printed" or otherwise formed over the respective faces of a thin dielectric annular sheet 11 having outer and inner peripheries shown at 11a and 12. As shown in FIG. 2, each open-loop turn is formed of two half-turn conductors 10 and $10^1$ carried on opposite faces of disc 11. The half-turn conductors on the front face of disc 11 being shown in solid lines at 10 and the other half-turn conductors mounted on the rear face of disc 11 being shown in dotted lines at $10^1$.

For simplicity's sake, a few turns only are drawn, but it is apparent that they are evenly interleaved or overlapped while being distributed over the annular area reserved for the winding.

Such a winding may be made as disclosed in the above mentioned co-pending application with the difference of course that in the present case terminals must be provided for the supply of A.C. current.

For example in the case of a closed loop winding, such as shown in FIG. 3, these terminals may comprise simple taps on the winding such as shown at $E_1$—$S_3$, $E_2$—$S_1$ and E₃—S₂ provided at intervals of 120° (electrical) along the periphery of the winding. In this arrangement the three-phase windings are interconnected in the conventional delta-arrangement.

Alternatively, a conventional star-arrangement may be used as shown in FIG. 4 by bringing out separate terminals $S_1$, $S_2$, $S_3$ and connecting terminals $E_1$, $E_2$, $E_3$ for the three coils to a common terminal. In this case, the terminals may be arranged as shown in FIG. 2 permitting a complete interleaving of the coil turns.

The interconnections of coils shown in FIGS. 2 to 4 represent illustrations only and other connections may be used if desired depending upon the number of phases of the A.C. current supply and corresponding to the interconnection arrangements used in conventionally wound motors.

The magnetic ring 2 of the stator is preferably so constructed as to avoid eddy currents. It may be made of a spiralled magnetic metal ribbon and the winding unit proper may be separately formed and thereafter "glued" to the smoothened face of such a ring. Otherwise, the winding may be formed by first depositing a dielectric film on that face (the film may be omitted if the surface of ring 2 is of an insulating character); the first part of the winding (the part formed of half-turns 10') is formed thereon and covered by a second dielectric film on which the second part (the part formed of half-turns 10) of the winding is formed.

The interconnections between the half-turn conductor forming the two parts of the winding may be made either by metallizing edge portions of the intermediate film at the ends of the conductors to be interconnected, or such connections may be made through holes in the intermediate dielectric film by suitable means such as electric soldering.

A spread-out squirrel-cage rotor winding in accordance with the invention may be produced, as shown in FIG. 5, by simply printing or otherwise forming over a magnetic ring area, a plurality of radial conductors 15 bridging annular conductors 13 and 14. Such pattern may be photo-etched or otherwise cut into a metal foil and then "glued" to the surface of magnetic ring 4 which may consist of sintered magnetic material or, preferably, of a closely wound spiralled ribbon of magnetic metal.

The resulting structure is a squirrel-cage rotor having a winding conductor thickness of the same order of magnitude as the stator winding conductors. It is of course important to reduce the rotor conductor thickness as much as possible to reduce to an optimum the spacing between the stator winding and the magnetic material of the rotor.

For this purpose, as a subsidiary feature of the invention, the rotor is specially constructed by forming recurrent indentations in the shape of rectangular notches in the edge of the magnetic metal ribbon prior to its spiralling. Subsequently, after the ribbon is wound into the annular ring the conductive metal to form the squirrel-cage winding is molded into the corresponding slots formed on the face of the ring by the notches in the edge of the ribbon and simultaneously with the molding of end rings 16 and 17 and, preferably, also simultaneously with the molding of rotor hub 6 on shaft 7. The width of each tooth formed between adjacent notches may be smaller than the width of each notch; together they define a "thread" or pitch $p = a+b$ which should differ from twice the product of thickness $e$ of the ribbon (viz. the difference of radii between two successive turns of the spiral) multiplied by the maximum radius of the ring formed by the spiral.

In this way, the slots formed in the face of ring 4 by the notches in the wound ribbon provide a substantial number of semi-radial paths extending across the face of the ring.

In such a molding arrangement as illustrated in FIGS. 6 and 7, a conductive metal, such as aluminum is injected under pressure into slots 19 formed between teeth 18 of a magnetic ribbon spiral such as illustrated in FIG. 1 at 4.

Simultaneously, two circular edge portions are formed representing the inner and outer peripheries of the rotor illustrated in both FIGS. 1 and 6, at 16 and 17. Since the teeth are narrower than the notches, a metallic continuity is ensured through meshes formed into a random network.

The structure of this network is apparent from FIG. 7 wherein certain substantially radial conducting paths are indicated by the wavy lines 20. Although the formation of such radial paths is of a random character caused by the spiralling of the notched ribbon, their angular distribution may be considered as substantially uniform over the entire circle.

Hub 6 of course may be formed together and integral with the metallic structure of the rotor. The apparent resistance, therefore, of the rotor depends upon the resistivity of the metal, ratio $a/b$, depth of slots, and cross section of rings 16 and 17. In fact, the cross section exposed to the magnetic flux of the stator is equal to that of the teeth and, consequently, has a ratio of $a(a+b)$ with respect to the area of the annular portion of the rotor facing the air-gap of the motor. Taking for instance $a/b$ equal to ½, the ratio of the area exposed to the flux with respect to the area of this annular surface is ⅓ and such a rotor may be considered as quite satisfactory as far as magnetization ampere-turns are concerned.

I claim:

1. An electric motor comprising a stator winding unit including a thin disc having a winding formed thereon within an annular portion of the disc, said winding being formed of a series of half-turn conductors attached to one face of said annular portion and a second series of half-turn conductors attached to the other face of said annular portion, the ends of said half-turn conductors being connected to form a winding by interconnections passing from one face of said disc to the other, a stator plate of magnetic material having said winding unit attached to one face thereof, current supply terminals connected to said winding and arranged along one periphery of the annular portion of said disc, and a rotor member comprising a disc of magnetic material having a flat annular face mounted to cooperate with said winding through a narrow annular air-gap, and a squirrel-cage closed-circuit winding carried by and distributed about the annular face of said rotor disc and inductively coupled with said stator winding.

2. A rotor for an electric motor comprising a magnetic ring formed of a ribbon of magnetic material coiled into a tight spiral, said ribbon being notched at equally spaced points along one edge thereof to provide rectangular substantially radial teeth on one face of said ring, said notches providing on one face of said rotor a series of generally radial slots of irregular configuration and a squirrel-cage winding formed of conductive material molded into said slots, and including conductive rings located at the inner and outer peripheries of said magnetic ring and being joined together by a plurality of irregularly distributed conductive paths formed by the metal molded within said irregularly distributed slots forming however paths of overall substantially radial orientations.

3. An electric motor according to claim 1, said winding comprising a plurality of coils related in number to the number of phases of electrical supply and said coils having their respective turns interleaved on the annular surfaces of the thin carrier thereof.

4. A motor according to claim 3, wherein all coil terminals of one type are connected to a common point.

5. A motor according to claim 1, wherein the winding disc of said stator winding is formed of a thin non-self-supporting sheet, said unit being glued over a smoothened surface of said stator magnetic plate.

6. A motor according to claim 1, wherein said stator winding has one series of half-turn conductors formed directly over the surface of said stator plate, and the second series of half-turn conductors is formed over a film of dielectric material applied to said first series of half-turn conductors.

7. A motor according to claim 1, wherein said magnetic stator plate is of a laminated structure to avoid eddy currents.

8. A motor according to claim 7 wherein said magnetic plate comprises a disc formed of a spiralled magnetic metal ribbon.

9. A motor according to claim 1, wherein said rotor comprises a disc-shaped ring of magnetic material having embedded on the airgap face thereof a conductive pattern consisting of a plurality of irregularly distributed substantially radial conductive paths bridging inner and outer conductive rings.

10. A motor according to claim 9, wherein said conductive pattern is inserted within slots of said magnetic ring.

11. A motor according to claim 9, wherein said magnetic ring is a spiralled magnetic metal ribbon.

12. A motor according to claim 11, wherein said ribbon is notched at its edge portion at equally spaced locations to provide rectangular substantially radial teeth on the face of said ring, said conductive pattern including conductive metal molded into the slots formed between said teeth.

13. A motor according to claim 12, wherein said rotor has a hub integral with the conductive metal of said pattern.

14. A motor according to claim 12, wherein the pitch of the teeth of said notched ribbon differs from twice the product of the thickness of the ribbon between successive turns thereof multiplied by the maximum radius of the ring formed by said spiralled magnetic metal ribbon.

15. A motor according to claim 12, wherein the ratio of the width of the teeth to the width of the notches is less than 1.

16. A motor according to claim 1 wherein said rotor comprises two conductive rings of non-magnetic material molded into circular depressions in the air-gap face of the rotor disc at the inner and outer peripheral edge portions thereof, said conductive rings being connected by irregularly spaced conductive paths molded in depressions formed in the air-gap face of said rotor disc, said paths being of substantially radial orientation and being formed in a number unrelated to the number of poles of the stator winding.

17. A stator construction for a multiphase dynamoelectric machine comprising a disc-shaped magnetic core member having on one radial face thereof a continuous annular surface located in a single flat plane throughout its annular extent, an electric winding carried on said annular surface and comprising a first series of flat half-turn winding conductors secured to said annular surface, said half-turn conductors being arranged transversely of said annular surface and being distributed throughout said annular surface, a thin layer of insulating material applied over said flat half-turn conductors, a second series of flat half-turn winding conductors secured to the outer face of said insulating layer and being distributed throughout the same annular area as said first series of conductors but crossing said annular area at angularly spaced locations with respect to said first series of conductors, the ends of said half-turn conductors of one series being connected to ends of the half-turn conductors of the other series to form a winding by interconnections passing from one face of said layer of insulating material to the other face thereof.

18. A stator construction according to claim 17 and including at least three current supply terminals connected to said winding at points spaced about the perimeter of said winding for energizing said winding with multi-phase currents and thereby to establish a rotating magnetic field within said magnetic core member over the portion thereof covered by said winding.

19. A rotor for an electric motor of the axial air-gap type comprising a disc-shaped ring of magnetic material having embedded in one radial face thereof a conductive pattern consisting of a plurality of irregularly distributed substantially radial conductive paths bridging inner and outer conductive rings.

20. A rotor according to claim 19, wherein said conductive pattern is inserted within slots of said magnetic ring.

21. A rotor according to claim 19, wherein said magnetic ring is a spiralled magnetic metal ribbon.

22. A rotor according to claim 21, wherein said ribbon is notched at its edge portion at equally spaced locations to provide rectangular substantially radial teeth on the face of said ring, said conductive pattern including conductive metal molded into the slots formed between said teeth.

23. A rotor according to claim 22, wherein said rotor has a hub integral with the conductive metal of said pattern.

24. A rotor according to claim 22, wherein the pitch of the teeth of said notched ribbon differs from twice the product of the thickness of the ribbon between successive turns thereof multiplied by the maximum radius of the ring formed by said spiralled magnetic metal ribbon.

25. A rotor according to claim 22, wherein the ratio of the width of the teeth to the width of the notches is less than 1.

26. A rotor for an electric motor of the axial air-gap type comprising a ring-shaped rotor disc of magnetic material, two conductive rings of non-magnetic material molded into circular depressions in the air-gap face of the rotor disc at the inner and outer peripheral edge portions thereof, said conductive rings being connected by irregularly spaced conductive paths molded in depressions formed in the air-gap face of said rotor disc, said paths being of tortuous form and adjacent paths being interconnected at irregularly distributed points between said conductive rings.

References Cited in the file of this patent

UNITED STATES PATENTS

| | | |
|---|---|---|
| 295,534 | Frick | Mar. 25, 1884 |
| 2,441,960 | Eisler | May 25, 1948 |
| 2,550,571 | Litman | Apr. 24, 1951 |
| 2,758,231 | Welter | Aug. 7, 1956 |
| 2,880,335 | Dexter | Mar. 31, 1959 |